United States Patent

Rösch et al.

[11] Patent Number: 5,409,635
[45] Date of Patent: Apr. 25, 1995

[54] ALIGNMENT LAYERS CONTAINING CYCLIC STRUCTURAL ELEMENTS

[75] Inventors: Norbert Rösch, Frankfurt am Main; Peter Wegener, Königstein/Taunus; Rainer Wingen, Hattersheim am Main, all of Germany

[73] Assignee: Hoechst Aktiengesellschaft, Frankfurt am Main, Germany

[21] Appl. No.: 934,470

[22] PCT Filed: Jan. 14, 1992

[86] PCT No.: PCT/EP92/00059
§ 371 Date: Sep. 11, 1992
§ 102(e) Date: Sep. 11, 1992

[87] PCT Pub. No.: WO92/13290
PCT Pub. Date: Aug. 6, 1992

[30] Foreign Application Priority Data

Jan. 15, 1991 [DE] Germany .............. 41 00 893.6

[51] Int. Cl.⁶ .................... C09K 19/56; G02F 1/13
[52] U.S. Cl. ...................... 252/299.4; 359/75
[58] Field of Search ............ 252/299.01, 299.4; 359/75, 77, 78; 428/1

[56] References Cited

U.S. PATENT DOCUMENTS

| | | | |
|---|---|---|---|
| 4,077,900 | 3/1978 | Pohl et al. | 252/299.1 |
| 5,178,792 | 1/1993 | Harada et al. | 252/299.6 |
| 5,196,501 | 3/1993 | Dübal et al. | 428/1 |
| 5,206,751 | 4/1993 | Escher et al. | 252/299.4 |

FOREIGN PATENT DOCUMENTS

| | | |
|---|---|---|
| 0385688 | 9/1990 | European Pat. Off. |
| 0453966 | 4/1991 | European Pat. Off. |
| 0429662 | 6/1991 | European Pat. Off. |
| 54-91253 | 7/1979 | Japan |

OTHER PUBLICATIONS

*Patent Abstracts of Japan*, vol. 3, No. 113.

Primary Examiner—Shean Wu
Attorney, Agent, or Firm—Curtis Morris & Safford

[57] ABSTRACT

An alignment layer for liquid-crystal displays which contains at least one compound containing, as structural element, a mediocyclic or macrocyclic carbon ring, results, in displays, in significantly increased contrast, inter alia.

The mediocyclic or macrocyclic structural elements may also contain heteroatoms, such as, for example, O, N and S atoms.

9 Claims, No Drawings

ALIGNMENT LAYERS CONTAINING CYCLIC STRUCTURAL ELEMENTS

BACKGROUND OF THE INVENTION

Switching and display elements containing ferroelectric liquid-crystal mixtures ("FLC light valves") are disclosed, for example, in EP-B 0 032 362. Liquid-crystal light valves are devices which modify their optical transmission properties, for example due to electrical switching, in such a way that light which is incident (and possible reflected again) is modulated in intensity. Examples are the known watch and calculator displays or liquid-crystal displays in the OA (office automation) or TV sectors. However, these also include light shutters, as employed in photocopiers, printers, welding goggles, polarizing spectacles for three-dimensional viewing, etc. So-called " spatial light modulators also fall within the area of application of liquid-crystal light valves (see Liquid Crystal Device Handbook, Nikkan Kogyo Shimbun, Tokyo, 1989; ISBN 4-526-02590-9C 3054 and the papers cited therein).

Electro-optical switching and display elements (displays) are constructed in such a way that the FLC layer is surrounded on both sides by layers which are usually, in this sequence starting from the FLC layer, at least one alignment layer, electrodes and a limiting plate (for example made of glass). In addition, they contain one polarizer if they are operated in "guest-host" mode or in reflective mode, or two polarizers if the transmissive birefrigence mode is used. Switching and display elements may, if desired, contain further auxiliary layers, such as, for example, diffusion barrier layers or insulation layers.

Together with a distance between the limiting plates which is chosen to be sufficiently small, the alignment layers, which comprise an organic (for example polyimide, polyamide or polyvinyl alcohol) or inorganic (for example SiO) material, bring the FLC molecules into a configuration in which the molecules lie with their long axes parallel to one another and the smectic planes are arranged perpendicular or inclined to the alignment layer. In this arrangement, the molecules are known to have two equivalent alignments, between which they can be switched by applying an electrical field in a pulsed manner, i.e. FLC displays are capable of bistable switching. The response times are inversely proportional to the spontaneous polarization of the FLC mixture and are in the range of microseconds.

The major advantage of FLC displays of this type over the LC displays which are still usually encountered in industrial practice is regarded as being the multiplex ratio which can be achieved, i.e. the maximum number of lines which can be addressed in the time-sequential process ("multiplex process"), which is virtually unlimited in FLC displays, in contrast to conventional LC displays. This electrical addressing is essentially based on the pulse addressing mentioned above and described in illustrative terms in SID 85 DIGEST p. 131 (1985).

Particularly important functional parameters of an FLC display are a) the maximum brightness (transmission in the bright state), b) the maximum contrast (ratio between the maximum transmission in the bright and dark states), c) the picture build-up rate (or the addressing rate of a pixel).

The object of the present invention is to provide alignment layers which, in ferroelectric liquid-crystal displays, result in improved brightness, lower residual transmission in the dark state and thus in a discrete improvement in the optical contrast.

In order to explain this object, the brightness (or transmission in the bright state), the transmission in the dark state, the contrast and the response time are described in more detail below.

The maximum transmission in the bright state T(bright) is, as is known, described for FLC displays to a good approximation by the equation (1):

$$T(\text{bright}) = \sin^2(\pi \Delta n d / \lambda) \sin^2(4\theta_{\text{eff}}) \quad (1)$$

where:

$\Delta n$ = difference between the refractive indices (uniaxial approximation)

$d$ = thickness of the FLC layer $\lambda$ = wavelength in vacuo $\theta_{\text{eff}}$ = effective tilt angle.

In the ideal case, T(bright) = 1 (= 100%).

While the first of the two terms in equation (1) can be optimized relatively easily by matching $\Delta n$ and d to the wavelength of visible light, the material-side optimization of $\sin^2(4\theta_{\text{eff}})$ causes problems since $\theta_{\text{eff}}$ is generally very much smaller than 22.5° (optimum value).

In the so-called "chevron" geometry (see, for example, T. Rieker al., 11th Int. Liq. Cryst. Conf. Berkeley (1986)), in which the smectic layers are at an angle to one another, the currently available materials only have an angle of up to about $\theta_{\text{eff}} = 8°$, which results in a maximum transmission T(bright) = 0.28 and thus corresponds to a loss of 72% of the light output of the FLC display illumination.

An exception with respect to the tilt angle is formed by FLC displays having an alignment layer of silicon monoxide (SiO) vapor-deposited at an angle, but this must be applied in a very complex and expensive vacuum process.

In the so-called "bookshelf" geometry (see, for example, H. R. Dübal al., Proc. 6th Intl. Symp on Electrets, Oxford, England (1988), and Y. Sato al., Jap. J. Appln. Phys. 28, 483 (1989)), in which the smectic layers are perpendicular to the glass plates, the special layer structure means that angles of approximately 22.5° are achieved with the available liquid-crystalline materials. In this structure, a transmission of T(bright) = 1 can be achieved.

As will be shown below, much greater effective tilt angles, and thus much greater transmission in the bright state, can be achieved using the alignment layers according to the invention in the "chevron" geometry than using conventional alignment layers.

The contrast is the ratio between the transmissions in the bright and dark switching states. At present, maximum contrast values of from 5 to 10 are given for FLC displays. The reason for these values, which are too low for many applications, for example TV, is both inadequate transmission in the bright state and excessive residual transmission in the dark switching state. The residual transmission can easily be detected between crossed polarizers from a bluish liquid-crystal structure. It is found for all FLC materials known hitherto if organic alignment layers, such as, for example, of rubbed polyimide or polyamide, are used. The causes are undesired non-uniformities of director (i.e. of the molecular preferential direction), which are known as twist states (see M. A. Handschy et al., Phys. Rev. Lett. 51, 471 (1983); M. Glogarova et al., J. Phys (France) 45, 143 (1984); N. Higi et al., Jap. J. Appln. Phys. 27, 8 (1988)). In the memory state and in multiplex mode, these non-uniformities result in a considerable reduction in the contrast of the display. In addition, the appearance of twist states is frequently associated with wavelength dispersion, which can result in distorted colors in the display.

It has already been attempted to suppress the appearance of the interfering twist states by a suitable choice of alignment layers, but hitherto only unsatisfactory results have been achieved. The virtually uniform states which sometimes appear (for example when silicon oxide vapor-deposited at an angle is used) very often proved to be unstable and relaxed again to give twist states.

The occurrence of twist states appears to be favored, in particular, if ferroelectric liquid-crystal mixtures of high spontaneous polarization are used (see M. A. Handschy et al., Ferroelectrics 59, 69 (1984)). However, such mixtures are particularly suitable for use in high-information displays since they result in short response times.

A further object of the present invention is to provide alignment layers which suppress the formation of twist states and thus enable the construction of ferroelectric displays of high brightness and high contrast.

The picture build-up rate or the picture change frequency is given by the number of lines of the FLC display and the duration of the electrical switching pulses. The shorter the pulses, the faster the picture build-up. On the other hand, the response time depends, on the material side, on the spontaneous polarization ($P_s$) and the viscosity ($\gamma$) of the FLC material.

Since the values for the rotational viscosity ($\gamma$) can only be reduced to a very limited extent, an increase in ($P_s$) is a suitable way of shortening the response time. However, this has hitherto failed due to reverse switching effects (probably caused by ionic impurities), which are described in the literature as "surface memory effects", "ghost pictures" and the like (cf., for example, J. DiJon al., SID conference, San Diego, 1988, pages 246-249).

The ionic impurities mean that a picture must be written a number of times so that the previous picture disappears completely ("ghost picture"). However, this effect, which greatly impairs the usefulness, is more pronounced the higher the spontaneous polarization of the FLC material.

DE-A-3 939 697 and EP-A-0 385 688 have already presented FLC mixtures which, in order to avoid or reduce the "ghost picture effect" in displays, contain, as one component, a complex ligand for ions.

It has been found that, inter alia, numerous complex ligands are suitable for eliminating twist states. For example, DE-A-4 012 750 has proposed, for example, applying macrocyclic substances of various structure to conventional alignment layers in order to improve the contrast of a display, but this is associated with additional complicated production steps.

SUMMARY OF THE INVENTION

The present invention proceeds from known FLC light valves or switching and display devices, as described, for example, in said EP-B 0 032 362. The switching and display devices contain the following constituents: a liquid-crystalline mixture, outer plate (for example made of glass or plastic), coated with transparent electrodes (two electrodes), at least one alignment layer according to the invention, spacers, adhesive frames, polarizers and, for colored displays, thin colored filters. Further possible components are antireflection, passivation, compensation and barrier layers and electrically nonlinear elements, such as, for example, thin-film transistors (TFTs) and metal-insulator-metal (MIM) elements. The general structure of liquid-crystal displays has already been described in detail in relevant monographs (for example E. Kaneko, "Liquid Crystal TV Displays: Principles and Applications of Liquid Crystal Displays", KTK Scientific Publishers, 1987, pages 12–30 and 163–172).

The invention relates to alignment layers which contain compounds containing certain structural elements and with whose help the formation of twist states both in the "chevron" geometry and in the "bookshelf" structure is prevented. Particularly preferred structural elements are mediocyclic or macrocyclic carbon rings ($\geq 13$ = macrocycles; according to Römpps Chemie Lexikon [Römpp's Lexicon of Chemistry], 8th Edn., Franksche Verlagsbuchhandlung, Stuttgart 1989), it also being possible for these to contain heteroatoms, such as oxygen, nitrogen, sulfur, silicon or boron. Particularly suitable structural elements prove to be macrocyclic compounds containing at least 12 ring members, in particular 15 to 27 ring members, the number of ring members being counted as being the largest possible enveloping ring.

DESCRIPTION OF THE PREFERRED EMBODIMENTS

In particular, suitable carbocyclic rings are those having 15, 16, 17 or 24 ring members, for example muscone derivatives, cyclohexanedecanone derivatives, zibetone derivatives or derivatives of cyclotetracosadiene and -triene, obtainable by metathesis reaction, for example from cyclooctadiene or cyclododecadiene, or by a ring enlargement reaction of cyclohexadecenone. Particularly advantageous heterocyclic compounds are derivatives of crown ethers and derivatized aza- and diaza-crown ethers, thus, for example, functionalized alkoxy-15-crown-5, alkoxy-18-crown-6, 1-aza-15-crown-5, 1-aza-18-crown-6 and 1,10-diaza-18-crown-6.

The cyclic compounds, as a constituent of the polymeric alignment layer, are bonded to the main polymer chain either directly as a side chain or via a spacer, or alternatively, as part of the main chain, are integrated into the latter, again if desired by means of spacers. If more than two polymerizable or polycondensable groups are on the cyclic compound, a polymerically crosslinked alignment layer with integrated cyclic compound is formed.

Particular preference is given to polymers of this type in which the starting materials (monomers) can be prepared with the cyclic compounds already correspondingly bonded.

This monomer thus comprises the abovementioned cyclic compound C and one or more polymerizable or polycondensable groups P bonded thereto, where C and P may, if desired, be bonded via a spacer S:

monomer: 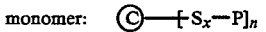

n=number of side chains in the monomer; x=0 or 1,
case a: if n=1, the ring is in the side chain,
case b: if n=2, the ring is in the main chain,
case c: if n=3, the ring is in the polymeric network.

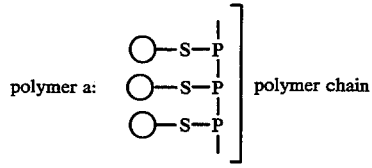

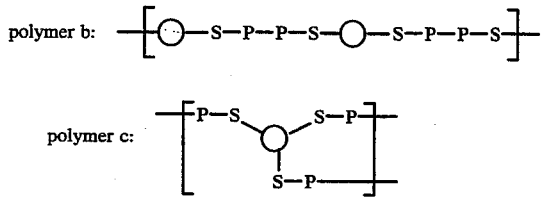

The invention thus relates in particular to an alignment layer which comprises a polymeric compound containing a macrocyclic structural element.

Particular preference is given to an alignment layer built up in accordance with the abovementioned scheme from a monomer which contains, as polymerizable group, an alkenyl radical, in particular a vinyl group, for example in the form of a vinyl ether —O—CH=CH$_2$, a vinyl ester —COO—CH=CH$_2$ or an acrylate, for example

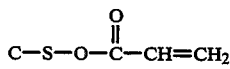

a methacrylate, for example

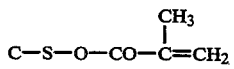

or an α-fluoroacrylate, for example

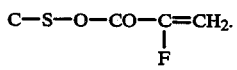

In particular the polyacrylates, polymethacrylates and polyfluoroacrylates are distinguished by a high glass transition temperature, hardness, good transparency and very good adhesion. They can be prepared as coatings directly on the cell surface at temperatures of from 70° to 140° C., preferably from 100° to 120° C., from the monomer by addition of free-radical initiators, such as, for example, azobisisobutyronitrile or dibenzoyl peroxide, in amounts of from 0.1 to 1.0% by weight, based on the monomer. In this way, a polymeric alignment layer containing the macrocyclic compound in the side chain is obtained.

Preference is also given to an alignment layer which comprises a polycondensate containing a macrocyclic structural element in the side chain, particular preference being given to a polycondensate based on a diisocyanate and a macrocyclic alcohol.

In this way, a main polymer chain which comprises a polydialkylurea containing the heterocyclic compound in the main chain:

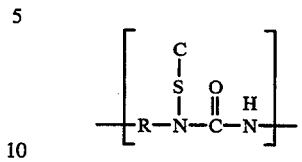

is obtained. In addition, the alignment layer may comprise a copolymer of at least two monomers, where at least one of the monomers contains a macrocyclic structural element.

The alignment layers according to the invention are applied by known processes, such as, for example, spin coating, dipping, spraying and printing, and, in the case of alignment layers which are already in polymeric form, are dried. If the starting materials (monomers) according to the invention are applied, they are converted into polymeric compounds by heating, exposure to light or addition of specific substances which initiate the build-up of the polymer skeleton (for example free-radical initiators, acids, bases or metal compounds).

In a further step, the alignment layers according to the invention are aligned, in general in a conventional manner using velvet-like substances or using brushes.

If the alignment layer is built up from monomers, these monomers preferably comprise the abovementioned cyclic groups and at least one polymerizable group, it also being possible for the polymer precursor and the cyclic compound to be separated by a spacer. If the cyclic compound is only connected to one monomer (polymerizable group) by a bond, it is in the side chain of the polymer; however, if it is bonded to two polymerizable groups, it is in the main chain of the polymer.

Spacers which can be used are in particular the following structural elements: alkyl or alkenyl groups having from 1–16 carbon atoms, in which one or more non-adjacent —CH$_2$—groups may be replaced by

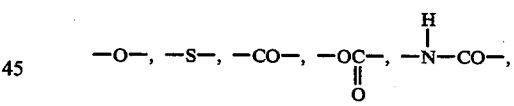

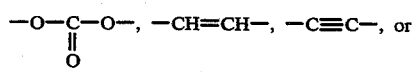

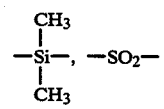

Particularly suitable spacers are those having 3 to 10 chain members, with a macrocyclic compound, as described above, being on one side of the spacer and a polymerizable or polycondensable function being at the other end of the spacer.

Particularly suitable spacers are derivatized 1,2-, 1,3-, 1,4-, 1,6-, and 1,8-alkanediols, such as, for example, derivatives of glycol, propanediol, butanediol and 2-butenediol, 1,6-hexanediol, and 1,8-octanediol, furthermore 6-hydroxycaproic acid derivatives, 6-aminocaproic acid derivatives, 1,9-nonanedicarboxylic acid or allylacetic acid. Di- or triethylene glycols are also suitable as spacers.

Thus, an acid function can be reacted, for example, with an aza-crown compound to give the corresponding amide, after which the second group in the spacer is derivatized by means of a polymerizable function, for example in the case of 6-hydroxycaproamide by esterification of the free hydroxyl group using α-fluoroacrylic acid, and in the case of allylacetamide by oxidation of the vinyl group to give the epoxide.

In particular, the spacer may also contain chiral ring members, for example if optically active lactates or optically active amino acid esters are used as part of the spacer. By means of this chirality, a particular alignment of the macrocyclic compounds can be induced, which allows the rubbing information to be replaced.

Suitable polymerizable groups are structures which are suitable for polymerization, polyaddition or polycondensation (cf. Houben-Weyl, Vol. 14/1+2, Georg Thieme Verlag).

Suitable monomers for polymerization include vinyl compounds, vinyl esters and ethers, acrylates and methacrylates.

Suitable monomers for polyaddition reactions are epoxides, ethylenimines, isocyanates and cyanates, and precondensates thereof which give prepolymers, such as, for example, urethanes with tertiary alcohols, uretdiones, allophanates and biurets. Also suitable for polyadditions are polymerizable lactones and lactams.

Diisocyanates can also be condensed by reaction with dialcohols to give polyurethanes and by reaction of diamines to give polyureas, the macrocyclic compounds again being in the main chain or in a side chain.

Particularly suitable here are aromatic diamines, since they give harder and thermostable polycondensates.

Polylactams as polycondensates can be obtained from a substituted dicarboxylic acid and a diamine by thermal condensation, the macrocyclic compounds being bonded to the dicarboxylic acid via a spacer, for example. It is also possible to polycondense a diaza-crown compound by condensation with an aromatic dicarboxylic acid, giving, for example, the following structure:

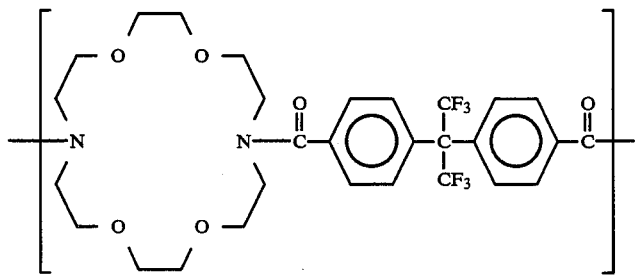

In the case of corresponding use of macrocyclic diamines and an aromatic tetracarboxylic acid, polyimides containing the macrocyclic structural elements in the main chain can be obtained by condensation, for example

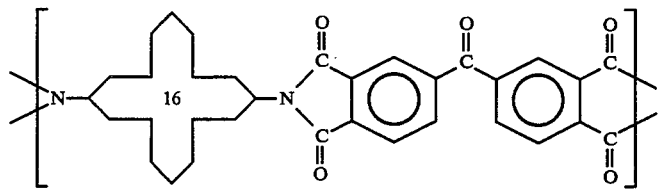

A further way of building up polymers comprises preparing compounds containing dimethylsilyl groups in the main chain. For example,

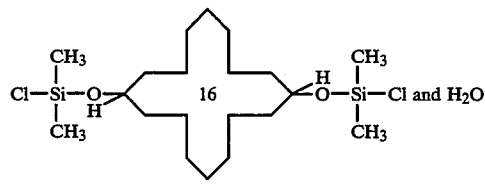

give a polysiloxane containing a macrocyclic ring in the main chain. Analogously, a polysulfamide containing a macrocyclic ring in the main chain can be obtained by condensation of aromatic disulfonyl chlorides with diaza-crown compounds:

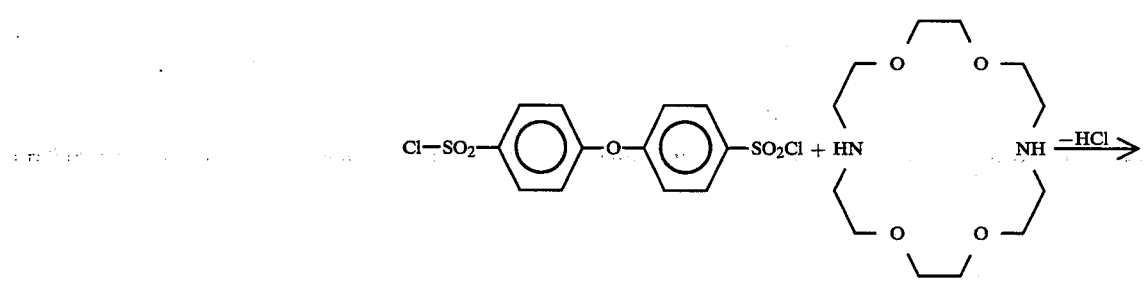

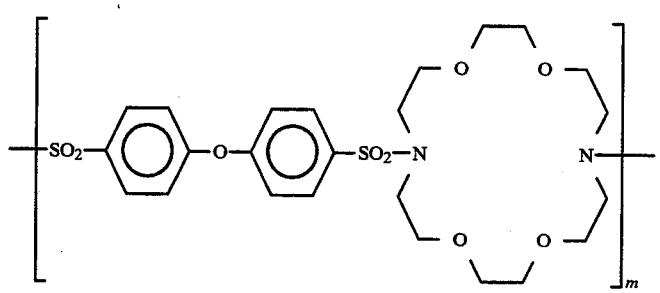

The polymers prepared from these monomers by heating, irradiation or the action of specific additives (for example free-radical formers) are light and heat stable (up to 200°) and form dense, transparent films which, after, for example, brushing or rubbing, represent an alignment layer for liquid crystals. Monomers which have proven particularly suitable are those prepared from diisocyanates as polymerizable group and monoalcohols or monoamines as the ring-carrying groups, for example in a molar ratio of 1:1. The ring and the alcohol function may also be separated by spacers. Also very highly suitable are polycondensates or oligomeric condensates made from diisocyanates and cyclic compounds containing one or two alcohol or amine functions, it being possible for the alcohol functions to be separated from the ring by spacers. These polymers may also be built up in the reverse order by condensation of cyclic compounds containing 2 isocyanate groups and alcohols, such as diols.

On the polymerization of the abovementioned polymers or on curing of the precondensates, polyurethanes or allophanes are obtained starting from alcohols and polArureas or polybiurets are obtained starting from amines (cf. in this respect Becker/Braun, Kunststoffhandbuch, Hauser Verlag, Munich, Vol. 7, p. 9–11). Depending on the curing temperature, some of the crosslinking may also occur due to cyclic trimerization of the isocyanate groups if excess free isocyanate groups are present.

In general, the polymerization and curing of the film is carried out, depending on the material employed, by conditioning at temperatures of from 120° to 220° C. and for from 15 minutes to 2 hours.

The invention is described in greater detail by means of the example below:

EXAMPLE 1

Preparation of a material for alignment layers 8-cyclohexadecen-1-one is converted into 8-cyclohexadecen-1-ol, b.p. 115° C./0.05 mbar, m.p. 67°–68° C., yield 80%, by reduction using $NaBH_4$ in ethanol, 3 hours at 60° C. 0.5 g of this alcohol is dissolved in 5 ml of methylene chloride together with 350 mg of 1,6-diisocyanatohexane, and a few drops of triethylamine are added. After the mixture has been left to stand for 3 days at room temperature, the intensity of the isocyanate band at 2250 $cm^{-1}$ no longer decreases in the IR, and the intensity of the urethane carbonyl band at 1700 $cm^{-1}$ no longer increases. Removal of the solvent by distillation leaves a viscous oil which, dissolved in cyclohexanone, serves as the starting material for the preparation of the alignment layer AL1.

Example 2

Preparation of a second material

Hydroxymethyl-18-crown-6 was prepared analogously to the synthesis of F. Montanari and P. Tundo (Tetrahedron Lett. 1979, 5055–5058). 0.6 g of this alcohol was dissolved in 5 ml of $CH_2Cl_2$ together with 330 mg of 1,6-diisocyanatohexane and a few drops of triethylamine. After 100 hours at room temperature, the intensities of the isocyanate and urethane bands in the IR no longer change. Removal of the solvent and the amine by distillation leaves a viscous oil whose NMR spectrum corresponds to the desired adduct. This substance is used as the starting material for alignment layer AL2.

Example 3

Construction of test cells

In order to demonstrate the advantageous properties of the alignment layers according to the invention, test cells were produced, filled with a ferroelectric liquid-crystal mixture and subsequently analyzed. To this end, glass plates coated with a 10×10 $mm^2$ electrode area of indium-tin oxide (ITO) were cleaned using an aqueous surfactant solution and subsequently with alcohol and then coated with a wet film of the corresponding alignment layer starting material, dissolved in cyclohexanone. The coating was carried out by means of a spin coater, but can also be carried out by other methods, such as, for example, printing or dipping. After the wet film had dried, the alignment layer is obtained under the action of heat, light or free-radical initiators. The film is subsequently rubbed with a velvet-like material, and the glasses are bonded to form the finished test cells. The cell thickness of 2 μm was set by means of glass spacers.

The FLC mixture employed to characterize the alignment layer has the following composition (in mol %):

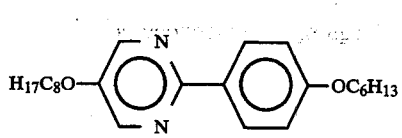

11.73

-continued

| Structure | Value |
|---|---|
| H₁₇C₈O–[pyrimidine]–[phenyl]–OC₈H₁₇ | 3.94 |
| H₁₇C₈O–[pyrimidine]–[phenyl]–OC₄H₉ | 12.96 |
| H₁₇C₈–O–[pyrimidine]–[phenyl]–OC₁₂H₂₅ | 7.15 |
| H₁₇C₈–O–[pyrimidine]–[phenyl]–OC₁₀H₂₁ | 7.13 |
| H₂₁C₁₀–[pyrimidine]–[phenyl]–OCO–[cyclohexyl-H]–C₅H₁₁ | 16.69 |
| H₁₇C₈–[pyrimidine]–[phenyl]–OC₁₂H₂₅ | 10.52 |
| H₁₇C₈–[pyrimidine]–[phenyl]–OCO–C₆H₁₃ | 17.55 |
| H₁₇C₈–O–[pyrimidine]–[phenyl]–OCH₂–*[dioxolane-spirocyclohexyl] (S) | 4.53 |
| C₈H₁₇–O–[pyrimidine]–[phenyl]–O–CO–[epoxide]*–*C₃H₇ (R)(R) | 2.70 |
| C₈H₁₇–[pyrimidine]–[phenyl]–O–CH₂–[epoxide]–C₄H₉ (S)(S) | 5.10 | and the phase sequence $S_c^*$ 61 $S_A^*$ 69 $N^*$ 85 I and a spontaneous polarization of 30 nC cm$^{-2}$ at a temperature of 20° C.

The measurement parameters used to characterize the liquid-crystal cell are the effective switching angle (cone angle), the uniformity (uniform director alignment in a switching state) and the contrast in the "chevron" geometry (structure I) and the contrast in the "bookshelf" geometry (structure IV). As a reference, commercially available test cells (AL3 from E. H. C., Tokyo), which use a polyimide as the alignment layer, were used. The alignment layers according to the invention are in test cells denoted (AL1) and (AL2).

In order to determine the measurement parameters, the test cells are mounted in a polarizing microscope fitted with a rotating stage with angle scale. A fast photodiode is also located in the ray part of the microscope and is used to measure the transmission during the switching process. The signal from the photodiode is fed to a storage oscilloscope. The test cell is addressed with the aid of a programmable signal generator.

Table 1 shows the effective switching angle, the uniform/twist ratio and the contrast of the two cells AL1 and AL2 containing alignment layers according to the invention compared with a conventional test cellAL3. A significant increase in the optical contrast in the test cells according to the invention, which is also significant in structure IV (Table 2), is apparent.

TABLE 1

Effective switching angle, uniform/twist ratio and optical contrast of test cells containing the FLC mixture M1 in the "chevron" geometry

|  | AL1 | AL2 | AL3 |
| --- | --- | --- | --- |
| $2\theta_{\mathit{eff}}$ (degrees) | 25 | 20 | 15 |
| uniform/twist | 88:12 | 90:10 | 0:100 |
| contrast | 34 | 38 | 6 |

TABLE 2

Optical contrast in the "bookshelf" geometry

|  | AL1 | AL2 | AL3 |
| --- | --- | --- | --- |
| contrast | 39 | 33 | 1 |

We claim:

1. A ferroelectric liquid-crystal display comprising an alignment layer, containing at least one compound which contains, as structural element, a mediocyclic or macrocyclic carbon ring having from 12 to 27 ring members, it also being possible for some of the carbon atoms in the ring to be replaced by heteroatoms selected from the group consisting of O, N, S, B and Si, characterized in that alignment layer comprises a polymeric compound containing a macrocyclic structural element.

2. Alignment layer according to claim 1, characterized in that it comprises a polymeric compound containing a mediocyclic or macrocyclic structural element in the side chain.

3. Alignment layer according to claim 1, characterized in that it comprises a polymeric compound containing a mediocyclic or macrocyclic structural element in the main chain.

4. A ferroelectric liquid-crystal display comprising an alignment layer, containing at least one compound which contains, as structural element, a mediocyclic or macrocyclic carbon ring having from 12 to 27 ring members, it also being possible for some of the carbon atoms in the ring to be replaced by heteroatoms selected from the group consisting of O, N, S, B and Si, characterized in that alignment layer contains at least one monomeric compound containing a mediocyclic or macrocyclic structural element, this cyclic element containing from 12 to 27 ring members and possibly nitrogen, oxygen and sulfur atoms in addition to carbon atoms.

5. Alignment layer according to claim 4, characterized in that the monomeric compound contains a polymerizable structural element.

6. A ferroelectric liquid-crystal display comprising an alignment layer, containing at least one compound which contains, as structural element, a mediocyclic or macrocyclic carbon ring having from 12 to 27 ring members, it also being possible for some of the carbon atoms in the ring to be replaced by heteroatoms selected from the group consisting of O, N, S, B and Si, characterized in that alignment layer comprises a polycondensate containing a mediocyclic or macrocyclic structural element in the side chain.

7. Alignment layer according to claim 6, characterized in that it comprises a polycondensate based on a diisocyanate and a macrocyclic alcohol.

8. A ferroelectric liquid-crystal display comprising an alignment layer, containing at least one compound which contains, as structural element, a mediocyclic or macrocyclic carbon ring having from 12 to 27 ring members, it also being possible for some of the carbon atoms in the ring to be replaced by heteroatoms selected from the group consisting of O, N, S, B and Si, characterized in that alignment layer comprises a copolymer of at least two monomers, where at least one of the monomers is a mediocyclic or macrocyclic compound.

9. Ferroelectric liquid-crystal display containing outer plates, electrodes, at least one alignment layer and a liquid-crystalline medium, characterized in that the alignment layer contains at least one compound which contains, as structural element, a mediocyclic or macrocyclic carbon ring having from 12 to 27 ring members, it also being possible for some of the carbon atoms of the ring to be replaced by heteroatoms selected from the group consisting of O, N, S, B and Si, characterized in that alignment layer comprises a polymeric compound containing a macrocyclic structural element.

* * * * *